United States Patent Office 3,488,356
Patented Jan. 6, 1970

3,488,356
2-ARYL-2-PIPERIDYL-TETRAHYDROFURANS
Adrian Marxer, Muttenz, Switzerland, assignor to Ciba Corporation, New York, N.Y., a corporation of Delaware
No Drawing. Filed Jan. 10, 1967, Ser. No. 608,277
Claims priority, application Switzerland, Jan. 19, 1966, 702/66; Dec. 9, 1966, 17,635/66
Int. Cl. C07d 99/04, 29/24; A61k 27/00
U.S. Cl. 260—294.7  28 Claims

ABSTRACT OF THE DISCLOSURE

New compounds of the formula

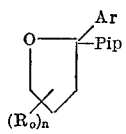

Ar=aryl (e.g. optionally substituted phenyl)
Pip=optionally substituted piperidyl
R=H, alkyl
n=integer of at most 6 for example: 2-(p-chlorophenyl)-2-(4-piperidyl)-tetrahydrofuran.

Use: anti-malaria agents.

BACKGROUND OF THE INVENTION

The invention concerns new 2-aryl-2-piperidyl-tetrahydrofurans, their salts and their preparation, which have not been heretofore disclosed in the literature and which have been found to have valuable antimalaria properties.

SUMMARY OF THE INVENTION

The present invention relates to tetrahydrofurans which contain an aryl radical and a piperidyl radical in the 2-position, and their salts.

The aryl radical is especially an at most binuclear carbocyclic aryl radical, above all a phenyl radical. It may be unsubstituted or substituted by one, two or more substituents. Possible substituents for this are above all lower alkyl radicals, lower alkoxy groups, halogen atoms and trifluoromethyl groups.

The piperidyl radical is a basic piperidyl radical. It is for example a 2-piperidyl radical or a 3-piperidyl radical, but especially a 4-piperidyl radical. It may be unsubstituted or substituted. Substituents at the nitrogen atom of the piperidyl radical are those which do not impair the basic character of the piperidyl radical, for example lower aliphatic hydrocarbon radicals such as lower alkyl or alkenyl radicals, cycloaliphatic hydrocarbon radicals such as cycloalkyl or cycloalkenyl radicals, araliphatic radicals such as phenyl-lower alkyl radicals, hydroxy-lower alkyl radicals or oxaalkyl radicals, and substituents of the carbon atoms of the piperidyl radical are above all one or more lower alkyl radicals.

The new compounds may contain further substituents, above all at the carbon atoms of the tetrahydrofuran ring, for example one or more lower alkyl radicals.

Lower alkyl radicals are, for example, methyl, ethyl, propyl or isopropyl radicals or linear or branched butyl, pentyl, or hexyl radicals bonded at any desired position.

Lower alkenyl radicals are for example allyl or methallyl radicals.

Lower alkoxy groups are preferably methoxy, ethoxy, propoxy, isopropoxy, butoxy or amyloxy groups, and possible halogen atoms are above all fluorine, chlorine or bromine atoms. As examples of phenyl-lower alkyl residues there may be mentioned 1-phenylethyl or 2-phenylethyl or benzyl residues which may also be substituted, for example as stated above for the aryl residues.

Cycloalkyl residues or cycloalkenyl residues are, for example, optionally lower-alkylated cyclopentyl, cyclohexyl, cycloheptyl, cyclopentenyl, cyclohexenyl or cycloheptenyl residues.

Oxaalkyl residues are above all lower oxaalkyl residues, for example lower alkoxy-lower alkyl residues, such as for example methoxyethyl, methoxypropyl, ethoxyethyl or ethoxybutyl residues.

The new compounds possess valuable pharmacological properties. In particular they are effective against protozoa, especially plasmodia, as is shown in animal experiments, for example with mice, infected with *Plasmodium berghei*, as well as against piroplasma, such as babesia, babesiella and theileria. They are furthermore also effective against such plasmodia as are resistant to known anti-malaria agents, like for example Chloroquin and Primaquin. The new compounds may therefore be used as agents against malaria, babesiosis, theileriosis, anaplasmosis and similar infections, especially against resistant forms of malaria. Moreover, they have a hypochloesteremic and diuretic activity and a stimulating effect on the central nervous system. The new compounds are however also valuable intermediates for the preparation of other useful substances, especially of pharmacologically active compounds.

The present invention also relates to the 2-aryl-2-pyridyl-tetrahydrofurans and their salts which correspond to the above-mentioned piperidyl-tetrahydrofurans. These pyridyl compounds are starting materials for the preparation of the piperidyl compounds (as described below).

Another embodiment of the present invention are the corresponding 2-aryl - 2 - (N-acyl-piperidyl)-tetrahydrofurans, in which the acyl radical is an acyl radical yielding on removal of the oxo group (e.g. with lithium aluminum hydride) a radical as defined above as N-substituent of the piperidyl radical. These N-acyl compounds are also valuable starting materials for the preparation of the above-mentioned 2-aryl-2-piperidyl compounds.

DESCRIPTION OF THE PREFERRED EMBODIMENTS

Special mention deserve the compounds of the formula

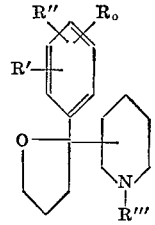

in which the radicals $R_o$, $R'$ and $R''$, which may be identical or different, denote lower alkyl radicals, hydrogen atoms, trifluoromethyl groups and/or especially lower alkoxy groups or halogen atoms such as chlorine atoms, and $R'''$ denotes a lower alkyl radical, for example methyl, or especially a hydrogen atom, above all those compounds of the preceding formula in which one or both of the radicals $R'$ and $R_o$ denote hydrogen atoms and $R''$ and $R'''$, and, as the case may be, $R_o$ and $R'$, have the significance indicated. Those compounds of the groups of compounds referred to are especially preferred in which the piperidyl radical is a 3-piperidyl radical, and above all those compounds in which it is a 4-piperidyl radical.

Of particular value is 2-phenyl-2-(4-piperidyl)-tetrahydrofuran as well as above all 2-(p-chlorophenyl)-2-(4- piperidyl)-tetrahydrofuran, which for example, in the form of its hydrochloride, shows a pronounced antimalarial effect when administered orally or subcutaneously to mice in dosages of for example 2.5 to 50 mg./kg.

The new 2-aryl-2-piperidyl-tetrahydrofurans are obtained by methods which are in themselves known.

It is preferable to proceed by reducing the pyridyl radical to the piperidyl radical in a tetrahydrofuran which contains an aryl radical and a pyridyl radical in the 2-position, advantageously with hydrogen in the presence of a hydrogenation catalyst, such as palladium, for example palladium black, platinum or nickel, for example Raney nickel.

The reduction of the pyridyl group (which may be quaternated) is carried out in known manner.

A further method for the preparation of the new 2-aryl-2-piperidyl-tetrahydrofurans for example, consists in reducing the oxo groups present to methylene groups in a tetrahydrofuran which in the 2-position has an aryl radical and a piperidyl radical, which carries an oxo group in the piperidyl nucleus and/or on the N-substituent which may optionally be present, at at least one carbon atom adjacent to the nitrogen atom. The reduction may take place in the usual manner, for example with lithium aluminum hydride.

Thus it is especially possible to reduce the acyl radical in tetrahydrofurans which possess an aryl radical and an N-acyl-piperidyl radical (in which the acyl radical is that of a carboxylic acid), such as an N-alkanoyl- or N-phenyl-alkanoyl-, N-hydroxy-alkanoyl- or N-oxaalkanoyl-piperidyl radical, in the 2-position.

To suit the definition of the final substances, further substituents may be introduced into the compounds obtained or substituents which are present may be eliminated or converted.

Thus for example the aforementioned substituents may be introduced into compounds obtained which have N-unsubstituted piperidyl radicals.

The substitution of the piperidine nitrogen atom takes place in the usual manner, for example by reaction with a reactive ester of a corresponding alcohol. Reactive esters are for example esters with strong inorganic acids, such as hydrohalic acids, for example hydrochloric, hydrobromic or hydriodic acid, or sulfuric acid, or esters with strong organic acids such as sulfonic acids, for example aryl-sulfonic acids such as benzenesulfonic or toluene-sulfonic acids.

The N-substitution may also take place reductively, for example by reaction with an oxo compound corresponding to the aforementioned alcohol, and simultaneous reduction. The reduction takes place in the usual manner, for example by means of hydrogen in the presence of a catalyst, such as a platinum, palladium or nickel catalyst, or by means of a hydride ion transfer agent such as formic acid.

In the compounds obtained which carry an α-aralkyl radical, for example a benzyl radical, on the piperidine nitrogen atom, this radical may be eliminated in the usual manner by hydrogenolysis, for example by reduction with catalytically activated hydrogen, such as hydrogen in the presence of a hydrogenation catalyst, such as a palladium or platinum catalyst.

In the compounds obtained which possess an unsaturated radical, for example an unsaturated radical of aliphatic character such as an alkenyl or cycloalkenyl radical, on the piperidine nitrogen atom, this radical may be converted to a corresponding saturated radical in the usual manner, by reduction, for example by means of catalytically activated hydrogen. This reduction may optionally take place simultaneously with one of the reductions described above.

The reactions referred to are carried out in a manner which is in itself known.

Depending on the process conditions and the starting materials, the final substances are obtained in the free form or in the form of their salts, which are also comprised in the invention.

The salts of the final substances may be converted into the free base in a manner which is in itself known, for example by means of alkalis or ion exchangers. Salts may be obtained from the latter bases by reaction with organic or inorganic acids, especially with those which are suitable for the formation of therapeutically usable salts. As examples of such acids; hydrohalic acids, sulfuric acids, phosphoric acids, nitric acids; aliphatic, alicyclic, aromatic or heterocyclic carboxylic or sulfonic acids, such as formic, acetic, propionic, succinic, glycollic, lactic, malic, tartaric, citric, ascorbic, maleic, hydroxymaleic or pyruvic acid; phenylacetic, benzoic, p-aminobenzoic, anthranilic, p-hydroxybenzoic, salicyclic or p-aminosalicyclic acid, embonic acid, methanesulfonic, ethanesulfonic, hydroxyethanesulfonic and ethylenesulfonic acid; halogenobenzenesulfonic, toluene sulfonic, and naphthalenesulfonic acids or sulfanilic acid; methionine or tryptophane.

These and other salts of the new compounds, like for example the picrates or perchlorates, may also serve for the purification of the bases obtained by converting the bases to salts, separating these and again liberating the bases from the salts. Because of the close relationship between the bases in the free form and in the form of their salts, whenever a free base is referred to in this context the corresponding salt is also intended provided such is possible or appropriate under the circumstances.

The starting materials and end products of the invention may be present as racemates or as optical antipodes.

Racemic starting materials or end products may be resolved into the optical antipodes by known methods. Thus, for example, the final substances obtained or the basic starting substances may be resolved into the optical antipodes as follows: the racemic bases, dissolved in a suitable inert solvent, are reacted with an optically active acid and the salts obtained are separated into the diastereomers, for example on the strength of their differing solubilities, from which diastereomers the antipodes of the new bases may be liberated by the action of alkaline reagents. Especially usual optically active acids are the D- and L-forms of tartaric acid, di-o-toluyl-tartaric acid, malic acid, mandelic acid, camphor-sulfonic acid or quinic acid. The separation may, for example, also be carried out by recrystallizing the pure racemate obtained from an optically active solvent. Preferably the more active of the two antipodes is isolated.

The invention also relates to those embodiments of the process according to which a compound obtainable as an intermediate product at any stage of the process is used as starting material and the remaining process steps are carried out or in which the process is discontinued at any stage.

For the reactions of the invention such starting materials as yield the above-mentioned preferred compounds are advantageously used.

Some of the starting materials are known. The starting materials which are new and prepared according to known methods.

Thus, for example, the tetrahydrofurans containing an aryl radical and a pyridyl radical in the 2-position may be prepared by reacting a-4-(tert. amino)-1-butanol having an aryl radical and a pyridyl radical in the 1-position with an alkylating reagent, for example a reactive ester of an alcohol, in the presence of a strong base. Hereupon the said butanol is alkylated and the product obtained is cyclized to the tetrahydrofuran.

The above-mentioned tetrahydrofurans which contain in 2-position an aryl radical and an N-acylpiperidyl radical used as starting materials may be obtained, when a resulting N-unsubstituted piperidyl-tetrahydrofuran is N-acylated, e.g. by reaction with an anhydride or halide, e.g. the chloride, of an appropriate carboxylic acid.

The new pharmacologically active compounds may be used as medicaments, for example in the form of pharmaceutical preparations in which they may be contained in the free form or in the form of their salts, in admixture or conjunction with a pharmaceutical organic or inorganic, solid or liquid, carrier suitable for enteral or parenteral application. Possible substances for producing these are such substances as do not react with the new compounds, like for example water, gelatine, lactose, starch, stearyl alcohol, magnesium stearate, talc, vegetable oils, benzyl alcohols, gums, propylene glycols, white petroleum jelly, cholesterol or other known medicament carriers. The pharmaceutical preparations may for example be present as tablets, dragees, capsules, suppositories or in the liquid form as solutions, (e.g. elixirs, syrups, etc.), suspensions or emulsions. They may be optionally sterilized and/or contain auxiliary substances such as preservatives, stabilizers, wetting agents or emulsifiers, solubilizing agents or salts for regulating the osmotic pressure or buffers. The pharmaceutical preparations are formulated according to the usual methods.

The new compounds may also be used in the form of feedstuffs or of additives for animal fodder, using for example, the usual extenders and diluents and/or feedstuffs.

The invention is described in more detail in the following examples. The tetrahydrofuran used as solvent for the Grignard reactions is absolute tetrahydrofuran.

EXAMPLE 1

22.5 g. (0.1 mol) of 2-phenyl-2-(4-pyridyl)-tetrahydrofuran are dissolved in 200 ml. of glacial acetic acid, treated with 0.5 g. of platinum oxide and hydrogenated with shaking at a temperature of 50° C. When the calculated amount of hydrogen (6.72 liters) has been taken up the catalyst is filtered off, the solvent is evaporated in vacuo, and the residue dissolved in 100 ml. of water and treated with 50 ml. of a 10 N aqueous sodium hydroxide solution. The base which separates out is taken up in ether. The residue obtained after drying the ethereal solution and evaporation of the ether is distilled in a high vacuum. 2-phenyl-2-(4-piperidyl)-tetrahydrofuran of the formula

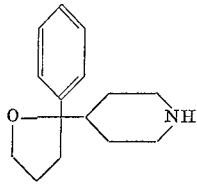

boiling point 120–122° C. (0.03 torr), is obtained.

By dissolving 18 g. of this base in 200 ml. of ethyl acetate and treating this with 38 ml. of 2.5 N ethanolic hydrochloric acid 2 - phenyl-2-(4-piperidyl)-tetrahydrofuran hydrochloride of melting point 174–176° C. is obtained.

The 2-phenyl-2-(4-pyridyl)-tetrahydrofuran used as the starting material may be obtained as follows:

The corresponding Grignard reagent is prepared in the usual manner by reacting 7.2 g. of magnesium and 36.6 g of γ-dimethyl-aminopropyl chloride in tetrahydrofuran, and this reagent is treated with 45.8 g. of 4-benzoyl-pyridine in 125 ml. of tetrahydrofuran. By decomposing the addition product with ammonium chloride in water and extracting with ether a residue of 4-(dimethylamino)-1-phenyl-1-(4-pyridyl)-1-butanol is obtained.

54.1 g. of this compound are dissolved in 200 ml. of xylene and heated for 3 hours with 11.0 g. of powdered sodium amide under reflux. The mixture is cooled and 30 g. (0.21 mol) of methyl iodide in 100 ml. of xylene are added dropwise at an internal temperature of 20–25° C., with gentle cooling; the mixture is thereafter slowly warmed to reflux temperature in the course of 1 hour, and then maintained at this temperature for 2 hours. It is treated with 100 ml. of water, with thorough cooling, diluted with ether, and the organic phase washed with water and extracted with a total of 300 ml. of 2 N hydrochloric acid. The hydrochloric acid extract is treated with 100 ml. of a 10 N aqueous sodium hydroxide solution. The oil formed is taken up in ether and the ethereal solution is dried. The residue obtained on evaporation of the ether is distilled twice to yield 2-phenyl-2-(4-pyridyl)-tetrahydrofuran of boiling point 139–141° C. (0.03 torr).

EXAMPLE 2

14.7 g. of 2-phenyl-2-(4-piperidyl)-tetrahydrofuran are boiled under reflux with 100 ml. of 80% formic acid and 20 ml. of 40% aqueous formaldehyde for 15 hours. The mixture is evaporated in vacuo, the residue taken up in 100 ml. of water, the solution treated with 100 ml. of a 10 N aqueous sodium hydroxide solution, and the aqueous solution extracted with ether. Distillation of the residue obtained by drying the ethereal solution and evaporating the ether yields 2-phenyl-2-(1-methyl-4-piperidyl)-tetrahydrofuran of the formula

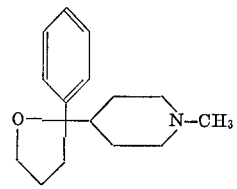

of boiling point 122–123° C. (torr).

The 2 - phenyl-2-(1-methyl-4-piperidyl-tetrahydrofuran hydrochloride is obtained by dissolving the base in ethyl acetate and treatment with ethanolic hydrochloric acid.

EXAMPLE 3

22.4 g. of 2-phenyl-2-(2-pyridyl)-tetrahydrofuran are hydrogenated at 50° C. in 200 ml. of glacial acetic acid, with the aid of 0.6 g. of platinum oxide. The hydrogenation ceases when 6.70 litres of hydrogen have been taken up. The catalyst is filtered off, the filtrate evaporated in vacuo, the residue dissolved in 100 ml. of water, precipitated with 150 ml. of a 10 N aqueous sodium hydroxide solution, extracted with ether, and the ethereal solution washed with water. Distillation of the residue obtained by drying the ethereal solution and evaporating the ether yields 2 - phenyl - 2 - (2-piperidyl)-tetrahydrofuran of the formula

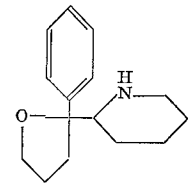

of boiling point 88–91° C. (0.01 torr).

Dissolving 15 g. of this base in ethyl acetate and treatment with 33 ml. of 2.6 N ethanolic hydrochloric acid yields 2 - phenyl-2-(2-piperidyl)-tetrahydrofuran hydrochloride, melting point 240–245° C.

The 2-phenyl-2-(2-pyridyl)-tetrahydrofuran used as the starting material may be prepared as follows:

The corresponding Grignard reagent is prepared in the usual manner by reacting 7.2 g. of magnesium and 36.6 g. of γ-dimethyl-aminopropyl chloride in tetrahydrofuran, and this reagent is treated with 45.8 g. of 2-benzoyl-pyridine in 125 ml of tetrahydrofuran. By decomposing the addition product with ammonium chloride in water and extracting with ether a residue of 4-(dimethylamino)-1-phenyl-1-(2-pyridyl)-1-butanol is obtained.

54.1 g. of this compound are dissolved in 200 ml. of xylene and heated for 3 hours with 11.0 g. of powdered sodium amide under reflux. The mixture is cooled and 30 g. (0.21 mol) of methyl iodide in 100 ml. of xylene are added dropwise at an internal temperature of 20–25° C., with gentle cooling; the mixture is thereafter slowly warmed to reflux temperature in the course of 1 hour, and then maintained at this temperature for 2 hours. It is treated with 100 ml. of water, with thorough cooling, diluted with ether, and the organic phase washed with water and extracted with a total of 300 ml. of 2 N hydrochloric acid. The hydrochloric acid extract is treated with 100 ml. of a 10 N aqueous sodium hydroxide solution. The oil formed is taken up in ether and the ethereal solution is dried. The residue obtained on evaporation of the ether is distilled to yield 2-phenyl-2-(2-piperidyl)-tetrahydrofuran which sinters at 57° C. and melts at 65° C.

EXAMPLE 4

16.2 g. of 2-phenyl-2-(2-piperidyl)-tetrahydrofuran are treated with 100 ml. of 85% formic acid and 20 ml. of 40% aqueous formaldehyde solution and heated under reflux for 15 hours. The mixture is evaporated in vacuo, 100 ml. of water and ether are added, and the mixture treated with a 10 N aqueous sodium hydroxide solution until it gives a strongly alkaline reaction. The aqueous solution is extracted with ether and the ethereal solution is washed with water. Distillation of the residue obtained by drying the ethereal solution and evaporating the ether yields 2-phenyl-2-(1-methyl-2-piperidyl)-tetrahydrofuran of the formula

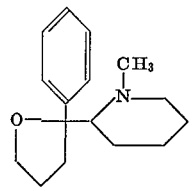

of boiling point 121–123° C. (0.04 torr).

2 - phenyl-2-(1-methyl-2-piperidyl)-tetrahydrofuran hydrofuran hydrochloride is obtained by dissolving the base in ethyl acetate and treating it with ethanolic hydrochloric acid.

EXAMPLE 5

33.9 g. of 2-(p-chlorophenyl)-2-(4-pyridyl)-tetrahydrofuran are hydrogenated in 300 ml. of glacial acetic acid by means of 0.65 g. of platinum oxide. When the theoretical amount of hydrogen has been taken up the catalyst is separated off, the solvent is evaporated in vacuo, and the residue is dissolved in 100 ml. of water and treated with 100 ml. of a 10 N aqueous sodium hydroxide solution. The base which separates out is taken up in ether. Distillation of the residue obtained by drying the ethereal solution and evaporating the ether yields 2-(p-chlorophenyl)-2-(4-piperidyl)-tetrahydrofuran of the formula

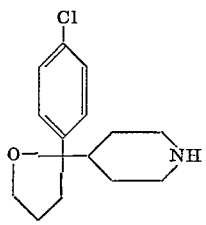

of boiling point 134–135° C. (0.02 torr).

By dissolving 15 g. of this base in 100 ml. of ethyl acetate and treating it with 21 ml. of 2.6 N ethanolic hydrochloric acid 2-(p-chlorophenyl)-2-(4-piperidyl)-tetrahydrofuran hydrochloride is obtained which sinters from 214° C. onwards and melts at 220° C.

The 2-(p-chlorophenyl)-2-(4-pyridyl)-tetrahydrofuran used as the starting material may be prepared as follows:

The corresponding Grignard reagent is prepared in the usual manner by reacting 7.2 g. of magnesium with 36.6 g. of γ-dimethylaminopropyl chloride in tetrahydrofuran, and this is treated with 54.5 g. of 4-(p-chlorobenzoyl)-pryridine in 125 ml. of tetrahydrofuran. On decomposing the addition product with ammonium chloride in water and extraction with ether a residue of 4 - (dimethylamino) - 1 - (p-chlorophenyl)-1-(4-pyridyl)-1-butanol is obtained. The 4-(dimethylamino)-1-(p-chlorophenyl) - 1 - (4 - pyridyl)-1-butanol hydrochloride sinters from 181° C. onwards and melts at 188° C.

60.9 g. of 4 - (dimethylamino)-1-(p-chlorophenyl)-1-(4-pyridyl)-1-butanol are dissolved in 200 ml. of xylene and heated for 3 hours under reflux with 11.0 g. of powdered sodium amide. The mixture is cooled and 30 g. (0.21 mol) of methyliodide in 100 ml. of xylene are added dropwise at an internal temperature of 20–25° C., with gentle cooling; the mixture is thereafter slowly warmed to reflux temperature in the course of 1 hour and maintained at this temperature for 2 hours. The mixture is treated with 100 ml. of water with thorough cooling, diluted with ether, and the organic phase washed with water and extracted with a total of 300 ml. of 2 N hydrochloric acid. The hydrochloric acid extract is treated with 100 ml. of a 10 N aqueous sodium hydroxide solution. The oil formed is taken up in ether and the ethereal solution is dried. The residue obtained on evaporation of the ether is distilled twice to yield 2-(p-chlorophenyl)-2-(4-pyridyl)-tetrahydrofuran of boiling point 122–126° C. (0.01 torr).

EXAMPLE 6

33.9 g. of 2 - (p - chlorophenyl)-2-(4-pyridyl)-tetrahydrofuran are dissolved in 200 ml. of ethanol and hydrogenated with 20 g. of Raney nickel in an autoclave at 40–60° and 60–90 atms. hydrogen pressure. Analogous working-up to that of Example 5 yields 2-(p - chlorophenyl) - 2 - (4-piperidyl)-tetrahydrofuran which is identical with the product described in Example 5.

EXAMPLE 7

9.75 g. of 2 - (p - chlorophenyl) - 2-(4-piperidyl)-tetrahydrofuran are treated with 25 ml. of 40% aqueous formaldehyde solution and 75 ml. of 85% formic acid and boiled overnight under reflux. The mixture is evaporated to dryness in vacuo, treated with water and excess of a 10 N aqueous sodium hydroxide solution and extracted with ether. The ethereal solution is washed with water. Distillation of the residue obtained by drying the ethereal solution and evaporating the ether yields 2-(p-chlorophenyl) - 2 - (1 - methyl - 4 - piperidyl)-tetrahydrofuran of the formula

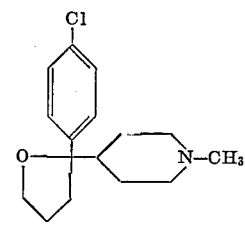

of boiling point 100–105° C. (0.01 torr).

Dissolving this base in ethyl acetate and treating it with ethanolic hydrochloric acid yields 2-(p-chlorophenyl) - 2 - (1 - methyl-4-piperidyl)-tetrahydrofuran hydrochloride.

EXAMPLE 8

52.0 g. of 2 - (p - chlorophenyl)-2-(2-pyridyl)-tetrahydrofuran are dissolved in 400 ml. of glacial acetic acid. 0.8 g. of platinum oxide is added and the mixture hydrogenated on a shaker. When 13.4 litres of hydrogen have been taken up the solution is separated from the catalyst and evaporated in vacuo. The residue is dissolved in 100 ml. of water, 150 ml. of a 10 N aqueous sodium hydroxide solution are added, and the mixture is extracted with ether. The ethereal solution is washed with water. Distillation of the residue obtained by drying the ethereal solution and evaporating the ether yields 2 - (chlorophenyl) - 2 - (2 - piperidyl)-tetrahydrofuran of the formula

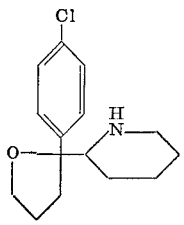

of boiling point 117–118° C. (0.01 torr).

Dissolving this base in ethyl acetate and treating it with ethanolic hydrochloric acid yields 2-(p-chlorophenyl) - 2 - (2 - piperidyl) - tetrahydrofuran hydrochloride of melting point 282–285° C.

The 2 - (p - chlorophenyl) - 2 - (2-pyridyl)-tetrahydrofuran used as the starting material may be obtained as follows:

The corresponding Grignard reagent is prepared in the usual manner by reacting 7.2 g. of magnesium and 36.6 g. of γ-dimethylaminopropyl chloride in tetrahydrofuran, and is treated with 54.5 g. of 2-(p-chlorobenzoyl)-pyridine in 125 ml. of tetrahydrofuran. On decomposing the addition product with ammonium chloride in water and extraction with ether 4-(dimethylamino)-1 - (p-chlorophenyl)-1-(2-pyridyl)-1-butanol is obtained as the residue. The 4-(dimethylamino) - 1 - (p-chlorophenyl) - 1 - (2-pyridyl)-1-butanol hydrochloride sinters from 180° C. onwards and melts at 186° C.

60.9 g. (0.2 mol) of 4-(dimethylamino)-1-(p-chlorophenyl) - 1 - (2-pyridyl)-1-butanol are dissolved in 200 ml. of xylene and heated for 3 hours under reflux with 11.0 g. of powdered sodium amide. The mixture is cooled and 30 g. (0.21 mol) of methyliodide in 100 ml. of xylene are added dropwise at an internal temperature of 20–25° C. with gentle cooling; the mixture is thereafter slowly warmed to reflux temperature in the course of 1 hour and kept at this temperature for 2 hours. The mixture is treated with 100 ml. of water with thorough cooling, diluted with ether, and the organic phase washed with water and extracted with a total of 300 ml. of 2 N hydrochloric acid. The hydrochloric acid extract is treated with 100 ml. of a 10 N aqueous sodium hydroxide solution. The oil formed is taken up in ether and the ethereal solution is dried. The residue obtained after evaporation of the ether is distilled twice to yield 2 - (p-chlorophenyl)-2-(2-pyridyl)-tetrahydrofuran of boiling point 125–128° C. (0.01 torr).

EXAMPLE 9

29.75 g. of 2 - (p - chlorophenyl)-2-(2-piperidyl)-tetrahydrofuran are boiled for 15 hours under reflux with 150 ml. of 85% formic acid and 50 ml. of 40% aqueous formaldehyde solution. The mixture is evaporated to dryness in vacuo, and the residue taken up in 100 ml. of water, treated with excess of a 10 N aqueous sodium hydroxide solution and extracted with ether. The ethereal solution is washed with water. Distillation of the residue obtained on drying the ethereal solution and evaporating the ether yields 2-(p-chlorophenyl)-2-(1-methyl-2-piperidyl)-tetrahydrofuran of the formula

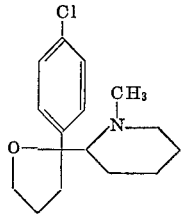

of boiling point 117° C. (0.01 torr).

Dissolving this base in ethyl acetate and treating it with ethanolic hydrochloric acid yields 2-(p-chlorophenyl)-2-(1-methyl-2-piperidyl)-tetrahydrofuran hydrochloride.

EXAMPLE 10

22.5 g. (0.1 mol) of 2-phenyl-2-(3-pyridyl)-tetrahydrofuran are dissolved in 200 ml. of glacial acetic acid, treated with 0.5 g. of platinum oxide and hydrogenated at a temperature of 50° C., with shaking. When the calculated amount of hydrogen (6.72 liters) has been taken up the catalyst is filtered off, and the solvent is evaporated in vacuo, dissolved in 100 ml. of water and treated with 50 ml. of a 10 N aqueous sodium hydroxide solution. The base which separates out is taken up in ether. The residue obtained on drying the ethereal solution and evaporating the ether is distilled in a high vacuum. 2-phenyl-2-(3-piperidyl)-tetrahydrofuran of the formula

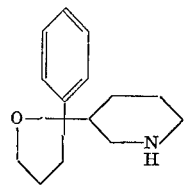

boiling point 98° C. (0.01 torr) is obtained.

Dissolving this base in ethyl acetate and treating it with ethanolic hydrochloric acid yields 2-phenyl-2-(3-piperidyl) tetrahydrofuran hydrochloride.

The 2-phenyl-2-(3-pyridyl)-tetrahydrofuran used as the starting material may be obtained analogously to the starting material of Example 1 by starting with 3-benzoyl-pyridine instead of 4-benzoyl-pyridine.

2-phenyl-2-(1-methyl-3-piperidyl)-tetrahydrofuran may be obtained by alkylation of 2-phenyl-2-(3-piperidyl)-tetrahydrofuran with formic acid and formaldehyde in an analogous manner to that described in Example 2.

EXAMPLE 11

36.5 g. (0.1 mol) of 2-(para-tolyl)-2-(4-pyridyl)-tetrahydrofuran are dissolved in 300 ml. of glacial acetic acid, hydrogenated with 0.6 g. of platinum oxide at a temperature of 38–40° C. and, after the calculated quantity of hydrogen (3 mols) has been taken up, the solvent is evaporated in vacuo, the residue dissolved in 150 ml. of water and treated with 150 ml. of a 10 N aqueous sodium hydroxide solution. The precipitated base is taken up in ether and the ethereal solution washed with water. The ethereal solution is dried, the ether evaporated and the residue distilled in a high vacuum, to yield 2-(para-tolyl)-2-(4-piperidyl)-tetrahydrofuran of the formula

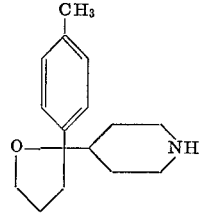

boiling at 122° C. under 0.03 mm. pressure of mercury.

By dissolving 20 g. of this base in 75 ml. of ethyl acetate and treating the solution with 25 ml. of 2.4 N ethanolic hydrochloric acid and a further 150 ml. of ethyl acetate, there is obtained 2-(para-tolyl)-2-(4-piperidyl)-tetrahydrofuran hydrochloride melting at 218–221° C.

The 2-(para-tolyl)-2-(4-pyridyl)-tetrahydrofuran used as starting material may be prepared as follows:

7.2 g. of magnesium and 36.6 g. of γ-dimethylaminopropyl chloride are reacted in tetrahydrofuran to prepare the corresponding Grignard reagent in the customary manner, the latter is treated with 49.30 g. of 4-(para-methyl-benzoyl)-pyridine (prepared from para-tolyl magnesium bromide and 4-cyanopyridine) in 125 ml. of tetrahydrofuran. The addition product is decomposed with ammonium chloride in water extracted with ether to yield as residue 4-(dimethylamino)-1-(para-tolyl)-1-(4-pyridyl)-1-butanol. 4-(dimethylamino) - 1 - (para-tolyl)-1-(4-pyridyl)-1-butanol hydrochloride melts at 161–163° C.

56.9 g. (0.2 mol) of 4-(dimethylamino)-1-(para-tolyl)-1-(4-pyridyl)-1-butanol are dissolved in 200 ml. of xylene and heated with 11.0 g. of pulverized sodium amide for 3 hours under reflux. The reaction mixture is cooled, and 30 g. (0.21 mol) of methyl iodide in 100 ml. of xylene are added dropwise at an internal temperature of 20–25° C. with gentle cooling; the reaction mixture is then heated slowly within one hour to reflux temperature and then maintained at this temeprature for 2 hours. 100 ml. of water are added while cooling thoroughly; the batch is diluted with ether, the organic phase washed with water and extracted with 300 ml. of 2 N acetic acid altogether and then with a total amount of 300 ml .of 2 N hydrochloric acid. The hydrochloric acid extract is treated with 150 ml. of a 10 N aqueous sodium hydroxide solution. The oil formed is taken up in ether, and the ethereal solution dried. The residue obtained after evaporation of the ether yields, after two distillations, 2-(para-tolyl)-2-(4-pyridyl)-tetrahydrofuran boiling at 125–126° C. under 0.02 mm. pressure of mercury.

EXAMPLE 12

13.8 of 2-(para-tolyl)-2-(4-piperidyl)-tetrahydrofuran are treated with 50 ml. of aqueous formaldehyde of 40% strength and 100 ml. of formic acid of 85% strength and heated for 15 hours at 125° C. The reaction mixture is evaporated in vacuo, the residue is taken up in 100 ml. of water, treated with 50 ml. of a 10 N aqueous sodium hydroxide solution, the precipitated oil is taken up in ether and the ethereal solution washed with water. The residue obtained after drying the ethereal solution and evaporating the ether is taken up in ethyl acetate and treated with ethanolic hydrochloric acid to yield 2-(para-tolyl)-2-(1-methyl-4-piperidyl)-tetrahydrofuran hydrochloride of the formula

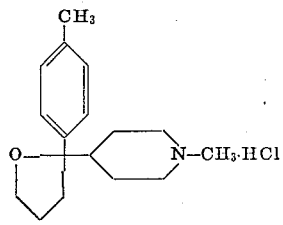

melting at 214–217° C.

EXAMPLE 13

34.05 g. of 2-(para-methoxyphenyl)-2-(4-pyridyl)-tetrahydrofuran are hydrogenated in 300 ml. of glacial acetic acid with 0.65 g. of platinum oxide. After the theoretical quantity of hydrogen has been taken up, the catalyst is separated, the solvent evaporated in vacuo, the residue dissolved in 100 ml. of water and treated with 100 ml. of a 10 N aqueous sodium hydroxide solution. The precipitated base is taken up in ether. The residue obtained by drying the ethereal solution and evaporating the ether is distilled to yield 2-(para-methoxyphenyl)-2-(4-piperidyl)-tetrahydrofuran of the formula

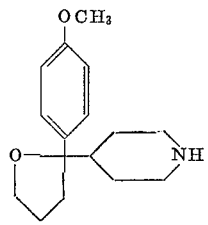

boiling at 148–153° C. under 0.08 mm. pressure of mercury.

By dissolving 19 g. of this base in 100 ml. of ethyl acetate and adding 33 ml. of 2.24 N ethanolic hydrochloric acid there is obtained 2-(para-methoxyphenyl)-2-(4-piperidyl)-tetrahydrofuran hydrochloride melting at 195–200° C.

The 2-(para-methoxyphenyl)-2-(4-pyridyl)-tetrahydrofuran used as starting material can be prepared as follows:

By reacting 7.2 g. of magnesium and 36.6 g. of γ-dimethlyaminopropyl chloride in tetrahydrofuran the corresponding Grignard reagent is prepared in the customary manner; the latter is treated with 53.30 g. of 4-(para-methoxybenzoyl)-pyridine (obtained from para-methoxyphenyl-magnesium bromide and 4-cyanopyridine) in 125 ml. of tetrahydrofuran. By decomposition of the addition product with ammonium chloride in water and extraction with ether there is obtained as residue 4-(dimethylamino)-1-(para-methoxyphenyl)-1-(4-pyridyl)-1-butanol.

60.0 g. of 4-(dimethylamino)-1-(para-methoxyphenyl)-1-(4-pyridyl)-1-butanol are dissolved in 200 ml. of xylene and heated with 11.0 g. of pulverised sodium amide for 3 hours under reflux. The reaction mixture is cooled and 30 g. (0.21 mol) of methyl iodide in 100 ml. of xylene are added dropwise at an internal temperature of 20–25° C. with gentle cooling, and the batch is then heated slowly, within 1 hour, to reflux temperature and maintained at this temperature for 2 hours. 100 ml. of water are added while cooling thoroughly, the batch is diluted with ether, the organic phase washed with water and extracted with a total amount of 300 ml. of 2 N acetic acid and then with a total amount of 300 ml. of 2 N hydrochloric acid. The hydrochloric acid extract is treated with 150 ml. of a 10 N aqueous sodium hydroxide solution. The oil formed is taken up in ether and the ethereal solution dried. The residue obtained after evaporating the ether yields, after two distillations, 2-(para-methoxyphenyl)-2-(4-pyridyl)-tetrahydrofuran boiling at 144–147° C. under 0.06 mm. pressure of mercury.

EXAMPLE 14

30.55 g. of 2-(meta-chlorophenyl)-2-(4-pyridyl)-tetrahydrofuran are hydrogenated in 300 ml. of glacial acetic acid with 0.65 g. of platinum oxide. When the absorption of hydrogen begins to slow down after about 6 hours, 0.6 g. of platinum oxide is again added. After the theoretical quantity of hydrogen has been absorbed, the catalyst is separated, the solvent evaporated in vacuo, the residue dissolved in 100 ml. of water and treated with 100 ml. of a 10 N aqueous sodium hydroxide solution. The separated base is taken up in ether. The residue obtained by drying the ethereal solution and evaporating the ether is distilled to yield 2-(meta-chlorophenyl)-2-(4-piperidyl)-tetrahydrofuran of the formula

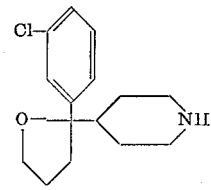

boiling at 135–139° C. under 0.04 mm. pressure of mercury.

29 g. of this base are dissolved in 100 ml. of ethyl acetate and treated with 59 ml. of 2.5 N ethanolic hydrochloric acid to yield 2-(meta-chlorophenyl)-2-(4-piperidyl)-tetrahydrofuran hydrochloride which melts at 224–227° C.

The 2 - (meta-chlorophenyl)-2-(4-pyridyl)-tetrahydrofuran used as starting material may be prepared as follows:

By reacting 7.2 g. of magnesium and 36.6 g. of γ-dimethylaminopropyl chloride in tetrahydrofuran the corresponding Grignard reagent is prepared in the customary manner; the latter is treated with 54.4 g. of 4-(meta-chlorobenzoyl)-pyridine (obtained from meta-chlorophenyl-magnesium bromide and 4-cyanopyridine) in 125 ml. of tetrahydrofuran. By decomposition of the addition product with ammonium chloride in water and extraction with ether there is obtained as residue 4-(dimethylamino)-1-(meta-chloro-phenyl)-1-(4-pyridyl)-1-butanol.

60.96 g. of 4-(dimethylamino)-1-(meta-chlorophenyl)-1-(4-pyridyl)-1-butanol are dissolved in 200 ml. of xylene and heated with 11.0 g. of pulverised sodium amide for 3 hours under reflux. The reaction mixture is cooled and 30 g. (0.21 mol) of methyl iodide in 100 ml. of xylene are added dropwise at an internal temperature of 20–25° C. with gentle cooling; the batch is then slowly heated, within 1 hour to reflux temperature and kept at this temperature for 2 hours. 100 ml. of water are added with thorough cooling, the reaction mixture is diluted with ether, the organic phase washed with water and extracted with a total amount of 300 ml. of 2 N acetic acid and then with a total amount of 300 ml. of 2 N hydrochloric acid. The hydrochloric acid extract is treated with 150 ml. of a 10 N aqueous sodium hydroxide solution. The oil formed is taken up in ether and the ethereal solution dried. The residue obtained after evaporation of the ether is distilled twice to yield 2-(meta-chlorophenyl)-2-(4-pyridyl)-tetrahydrofuran boiling at 165° C. under 0.08 mm. pressure of mercury.

EXAMPLE 15

30.07 g. (0.068 mol) of 1-(β-phenylethyl)-4-[2-(para-chlorophenyl) - tetrahydro - 2-furyl]-pyridinium bromide are dissolved in 300 ml. of glacial acetic acid, treated with 500 mg. of platinum oxide and hydrogenated at 43–45° C. After the calculated quantity of hydrogen has been taken up, the catalyst is filtered off, the solvent evaporated in vacuo, the crystalline residue suspended in water and isolated again by filtering with suction to yield the difficulty water-soluble 2-(para-chlorophenyl)-2-[1-(β - phenylethyl)-4-piperidyl]-tetrahydrofuran hydrobromide of the formula

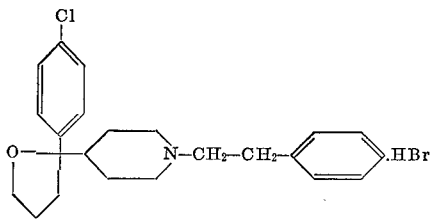

melting at 240–245° C. This compound is suspended in 300 ml. of water, agitated with 50 ml. of a 10 N aqueous sodium hydroxide solution and with ether until a clear ether solution is obtained. The latter is extracted with 400 ml. of N hydrochloric acid in all, 2-(para-chlorophenyl)-2-[1-(β-phenylethyl)-4-piperidyl]-tetrahydrofuran hydrochloride crystallizing out. For further purification the latter is suspended in acetone and filtered with suction; it melts at 233–237° C.

The 1-(β-phenylethyl)-4-[2-(para-chlorophenyl)-tetrahydro-2-furyl]-pyridinium bromide used as starting material may be prepared as follows:

25.97 g. (0.1 mol) of 2-(para-chlorophenyl)-2-(4-pyridyl)-tetrahydrofuran are dissolved in 100 ml. of toluene. 19.43 g. (0.105 mol) of β-phenylethyl bromide are added dropwise to the solution, the batch is heated for 2 hours at 60° C. and then for 4 hours in a bath at 120° C. On cooling, the toluene is poured off from the viscous resin formed and the latter is taken up in 100 ml. of alcohol, filtered and evaporated to dryness in vacuo. As residue there is obtained 1-(β-phenylethyl)-4-[2-(para-chlorophenyl)-tetrahydro-2-furyl]-pyridinium bromide which may be used without any further purification.

EXAMPLE 16

12.2 g. of 2-(para-chlorophenyl)-2-(1-acetyl-4-piperidyl)-tetrahydrofuran are dissolved in 50 ml. of dioxan and added dropwise to a suspension of 5.5 g. of lithium aluminium hydride in 75 ml. of dioxan. The internal temperature is raised first to 55° C., then gradually to 90° C. and the batch is then stirred for 12 hours in an oil bath at 110° C. After cooling, 5.5 ml. of water are first added with stirring, then 5.5 ml. of sodium hydroxide solution of 15% strength and then 16.5 ml. of water, the reaction mixture is filtered with suction, washed with dioxan and the dioxan solution evaporated to dryness. The residue is subjected to distillation in a high vacuum to yield 2-(para-chlorophenyl)-2-(1-ethyl-4-piperidyl)-tetrahydrofuran of the formula

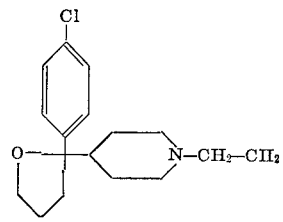

boiling at 100–105° C. under 0.01 mm. pressure of mercury.

By dissolving 7.7 g. of this base in 50 ml. of ethyl acetate and adding 11 ml. of 2.6 N ethanolic hydrochloric acid until the reaction is acid and by treatment with three times its quantity of ether there is obtained 2-(para-chlorophenyl)-2-(1-ethyl-4-piperidyl)-tetrahydrofuran hydrochloride melting at 207–209° C.

The 2-(para-chlorophenyl)-2-(1-acetyl-4-piperidyl)-tetrahydrofuran used as starting material may be prepared as follows:

14.42 g. of 2-(para-chlorophenyl)-2-(4-piperidyl)-tetrahydrofuran are heated in 100 ml. of acetic acid anhydride for 5 hours in an oil bath at 50° C. The reaction mixture is evaporated to dryness in vacuo, agitated with 100 ml. of water and ether, the ether extracted twice with 2 N hydrochloric acid, dried and evaporated to yield 2-(para-chlorophenyl)-2-(1-acetyl-4-piperidyl)-tetrahydrofuran as a viscous oil which can be processed without any further purification.

EXAMPLE 17

53.16 g. (0.2 mol) of 2-(para-chlorophenyl)-2-(piperidyl)-tetrahydrofuran are dissolved in 200 ml. of absolute ethanol and treated with a solution of 30 g. (0.2 mol) of D-tartaric acid in 200 ml. of absolute ethanol. The tartrate crystallizes almost quantitatively. It is recrystallized twice from 1 litre of ethanol and 200 ml. of water, then once from 900 ml. of ethanol and 220 ml. of water. From this tartrate the free base is recovered by agitation with 2 N sodium hydroxide solution and ether. Optical rotation: $[\alpha]_D$ (in chloroform 2%)=+4°±0.5°. 18.35 g. of this base are dissolved in 75 ml. of ethanol and added to a solution of 10.35 g. of D-tartaric acid in 75 ml. of ethanol and 75 ml. of water. The resulting tartrate is again recrystallized from a mixture of ethanol and water. The liberated base now has an optical rotation $[\alpha]_D$ (in chloroform 2%) of +10°±0.5° C. After again being converted with D-tartaric acid into its tartrate and recrystallized from a mixture of ethanol and water, the tartrate melts at 241–245° C. The (+)-2-(para-chlorophenyl)-2-(4-piperidyl)-tetrahydrofuran prepared from the tartrate has an optical rotation $[\alpha]_D$ (in chloroform 2%) of +15°±0.5°. By dissolving the base in ethyl acetate and adding ethanolic hydrochloric acid there is obtained (+)-2-(para-chlorophenyl)-2-(4-piperidyl) - tetrahydrofuran hydrochloride; optical rotation $[\alpha]_D$ (in chloroform 2%)+15°±0.05°.

The mother liquors of the first, second and third crystallizations are combined, evaporated in vacuo and the base isolated from the residue with 2 N sodium hydroxide solution and ether. ($[\alpha]_D$ in chloroform 2%=−4°±0.5°). This base is dissolved in ethanol and treated with D-tartaric acid in a mixture of ethanol and water (1:1). After about one quarter of the calculated quantity has crystallized out, the batch is filtered with suction, the mother liquor evaporated to dryness and the residue again crystallized from a mixture of ethanol and water (2:1) but in such a way that, after crystallization of about one quarter, the batch is again filtered with suction, the mother liquor evaporated to dryness and the base liberated from the residue. By repeating this procedure there is obtained (—)-2-(para-chlorophenyl)-2-(4-piperidyl) - tetrahydrofuran; optical rotation $[\alpha]_D$ (chloroform 2%) $-15° \pm 0.05°$.

EXAMPLE 18

Tablets containing 100 mg. of 2-(para-chlorophenyl)-2-(4-piperidyl)-tetrahydrofuran hydrochloride may be prepared, for example, with the following ingredients:

| | Mg. per tablet |
|---|---|
| 2-(para-chlorophenyl) - 2 - (4-piperidyl)-tetrahydrofuran hydrochloride | 100 |
| Lactose | 50 |
| Wheat starch | 50 |
| Colloidal silicic acid | 13 |
| Arrowroot | 24 |
| Talc | 12 |
| Magnesium stearate | 1 |
| | 250 |

METHOD

2 - (para-chlorophenyl)-2-(4-piperidyl)-tetrahydrofuran hydrochloride is mixed with the lactose, part of the wheat starch and with the colloidal silicic acid, and the mixture passed through a sieve. The remaining wheat starch is pasted with five times the quantity of water on a waterbath, and the powdery mixture is kneaded with this paste until a slightly plastic mass is formed. The plastic mass is passed through a sieve having a mesh of about 3 mm., dried and the dried granule again passed through a sieve. The arrowroot, talc and magnesium stearate are then added and the resulting mixture compressed into tablets weighing 250 mg.

What I claim is:
1. A member selected from the group consisting of compounds of the formula

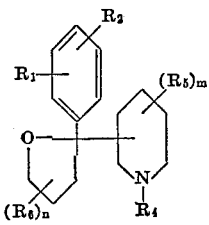

in which $R_1$ and $R_2$ each stands for a member selected from the group consisting of hydrogen, lower alkyl, lower alkoxy, halogen and trifluoromethyl, $R_4$ stands for a member selected from the group consisting of hydrogen, lower alkyl and phenyl-lower alkyl, $R_5$ and $R_6$ each stands for a member selected from the group consisting of hydrogen and lower alkyl, $m$ is an integer of at most 4 and $n$ an integer of at most 6, and their acid addition salts.

2. A product as claimed in claim 1, in which $R_1$, $R_5$ and $R_6$ stand for hydrogen atoms, $R_2$ and $R_4$ have the meanings given in claim 1.

3. A product as claimed in claim 1, in which $R_1$, $R_5$ and $R_6$ stand for hydrogen atoms, $R_2$ has the meaning given in claim 1 and $R_4$ represents a member selected from the group consisting of lower alkyl and hydrogen.

4. A product as claimed in claim 3, wherein the piperidyl radical is a piperidyl-4 radical.

5. A product as claimed in claim 1, which product is the 2-phenyl-2-(4-piperidyl)-tetrahydrofuran or an acid addition salt thereof.

6. A product as claimed in claim 1, which product is the 2-phenyl-2-(1-methyl-4-piperidyl)-tetrahydrofuran or an acid addition salt thereof.

7. A product as claimed in claim 1, which product is the 2-phenyl-2-(2-piperidyl)-tetrahydrofuran or an acid addition salt thereof.

8. A product as claimed in claim 1, which product is the 2-phenyl-2-(1-methyl-2-piperidyl)-tetrahydrofuran or an acid addition salt thereof.

9. A product as claimed in claim 1, which product is the 2-(para-chlorophenyl)-2-(4-piperidyl)-tetrahydrofuran or an acid addition salt thereof.

10. A product as claimed in claim 1, which product is the 2-(para-chlorophenyl)-2-(1-methyl-4-piperidyl)-tetrahydrofuran or an acid addition salt thereof.

11. A product as claimed in claim 1, which product is the 2-(para-chlorophenyl)-2-(2-piperidyl)-tetrahydrofuran or an acid addition salt thereof.

12. A product as claimed in claim 1, which product is the 2-(para-chlorophenyl)-2-(1-methyl-2-piperidyl)-tetrahydrofuran or an acid addition salt thereof.

13. A product as claimed in claim 1, which product is the 2-phenyl-2-(3-piperidyl)-tetrahydrofuran or an acid addition salt thereof.

14. A product as claimed in claim 1, which product is the 2-phenyl-2-(1-methyl-3-piperidyl)-tetrahydrofuran or an acid addition salt thereof.

15. A product as claimed in claim 1, which product is the 2-(para-tolyl)-2-(4-piperidyl)-tetrahydrofuran or an acid addition salt thereof.

16. A product as claimed in claim 1, which product is the 2-(para-tolyl) - 2-(1-methyl-4-piperidyl)-tetrahydrofuran or an acid addition salt thereof.

17. A product as claimed in claim 1, which product is the 2-(para-methoxyphenyl) - 2-(4-piperidyl)-tetrahydrofuran or an acid addition salt thereof.

18. A product as claimed in claim 1, which product is the 2-(meta-chlorophenyl) - 2-(4-piperidyl)-tetrahydrofuran or an acid addition salt thereof.

19. A product as claimed in claim 1, which product is the 2-(para-chlorophenyl) - 2-[1-($\beta$-phenylethyl)-4-piperidyl]-tetrahydrofuran or an acid addition salt thereof.

20. A product as claimed in claim 1, which product is the 2-(para-chlorophenyl) - 2-(1-ethyl-4-piperidyl)-tetrahydrofuran or an acid addition salt thereof.

21. A product as claimed in claim 1, which product is the (+)-2-(para-chlorophenyl) - 2-(4-piperidyl)-tetrahydrofuran or an acid addition salt thereof.

22. A product as claimed in claim 1, which product is the (—)-2-(para-chlorophenyl)-2-(4-piperidyl)-tetrahydrofuran or an acid addition salt thereof.

23. A product as claimed in claim 1 in its (+)-form.

24. A product as claimed in claim 1 in its (—)-form.

25. A member selected from the group consisting of compounds of the formulae

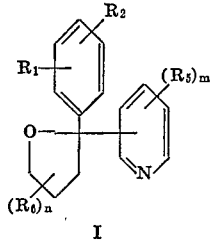 and 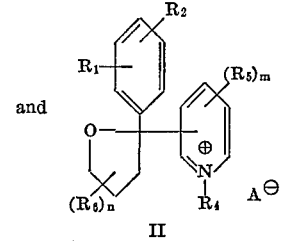

I  II in which $R_1$ and $R_2$ each stands for a member selected from the group consisting of hydrogen, lower alkyl, lower alkoxy, halogen and trifluoromethyl, $R_4$ stands for a member selected from the group consisting of hydrogen, lower alkyl and phenyl-lower alkyl, $R_5$ and $R_6$ each stands for a member selected from the group consisting of hydrogen and lower alkyl, $m$ is an integer of at most 4 and $n$ an integer of at most 6 and $A^\ominus$ represents an anion, and the acid addition salts of the compounds of Formula I.

26. A product as claimed in claim 25, which product is the 2-(para-chlorophenyl) - 2-(4-pyridyl)-tetrahydrofuran or an acid addition salt thereof.

27. A compound of the formula

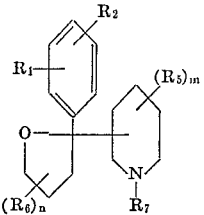

in which $R_1$ and $R_2$ each stands for a member selected from the group consisting of hydrogen, lower alkyl, lower alkoxy, halogen and trifluoromethyl, $R_7$ stands for a member selected from the group consisting of lower alkanoyl, benzoyl and phenyl-lower alkanoyl, $R_5$ and $R_6$ each stands for a member selected from the group consisting of hydrogen and lower alkyl, $m$ is an integer of at most 4 and $n$ an integer of at most 6.

28. A compound as claimed in claim 27, which compound is the 2-(para-chlorophenyl) - 2-(1-acetyl-4-piperidyl)-tetrahydrofuran.

References Cited

UNITED STATES PATENTS 2,916,493   12/1959   Jacob et al.
2,971,003   2/1961    Parker et al. _____ 260—297

HENRY R. JILES, Primary Examiner
S. D. WINTERS, Assistant Examiner

U.S. Cl. X.R.
260—293.4, 294, 297; 424—267